US012766353B2

(12) United States Patent
Holt

(10) Patent No.: US 12,766,353 B2
(45) Date of Patent: Oct. 20, 2026

(54) DEVICE FOR DELIVERING GASES CONTAINED THEREIN FOR EXTINGUISHING FIRE IN AN ENCLOSED SPACE

(71) Applicant: William Holt, Arkadelphia, AR (US)

(72) Inventor: William Holt, Arkadelphia, AR (US)

( * ) Notice: Subject to any disclaimer, the term of this patent is extended or adjusted under 35 U.S.C. 154(b) by 243 days.

(21) Appl. No.: 18/637,851

(22) Filed: Apr. 17, 2024

(65) Prior Publication Data

US 2024/0261611 A1 Aug. 8, 2024

Related U.S. Application Data

(63) Continuation-in-part of application No. 17/674,274, filed on Feb. 17, 2022, now abandoned.

(60) Provisional application No. 63/150,144, filed on Feb. 17, 2021.

(51) Int. Cl.

*A62C 13/64* (2006.01)
*A62C 13/76* (2006.01)
*A62D 1/00* (2006.01)

(52) U.S. Cl.

CPC .............. *A62C 13/64* (2013.01); *A62C 13/76* (2013.01); *A62D 1/0092* (2013.01)

(58) Field of Classification Search

CPC ......... A62C 13/62; A62C 13/64; A62C 13/76; A62C 99/0018; A62C 35/10; A62C 19/00; A62C 5/006; A41H 31/005; D05B 89/00

See application file for complete search history.

(56) References Cited

U.S. PATENT DOCUMENTS

| | | | | |
|---|---|---|---|---|
| 1,342,580 A | | 6/1920 | Bastian | |
| 5,590,717 A | * | 1/1997 | McBay | A62C 35/10 169/69 |
| 9,162,096 B2 | | 10/2015 | Lee | |
| 9,956,445 B2 | | 5/2018 | Enk, Sr. | |
| 11,400,325 B1 | | 8/2022 | Stodola | |

(Continued)

FOREIGN PATENT DOCUMENTS

| | | |
|---|---|---|
| CN | 2649125 Y | 10/2004 |
| CN | 204219653 U | 3/2015 |

(Continued)

OTHER PUBLICATIONS

Elahi, Ashique E et al.; Development of an Innovative Fireball Fire Extinguishing System; https://www.researchgate.net/profile/Minhajur-Rahman/publication/341266260_Development_of_an_Innovative_Fireball_Fire_Extinguishing_System/links/5f0e532392851c1eff11b381/Development-of-an-Innovative-Fireball-Fire-Extinguishing-System.pdf.

(Continued)

*Primary Examiner* — Christopher R Dandridge
(74) *Attorney, Agent, or Firm* — HULSEY P.C.

(57) ABSTRACT

The present invention discloses a device for delivering gases for extinguishing fire in an enclosed space. The device includes a container for storing an extinguishing agent under pressure. The device includes an outer housing. The outer housing receives the container. The outer housing includes slits. The device includes locking pins for locking the container to the outer housing. The device is operatively thrown into the enclosed space under fire such that the outer housing retains its shape upon impact without fragmenting while preventing damage to the container. The container operates to dispense the extinguishing agent through the slits for extinguishing the fire.

8 Claims, 12 Drawing Sheets

(56) References Cited

U.S. PATENT DOCUMENTS

| | | | |
|---|---|---|---|
| 2015/0217155 A1 | 8/2015 | Lee | |
| 2018/0021610 A1 | 1/2018 | Yeum et al. | |

FOREIGN PATENT DOCUMENTS

| | | | |
|---|---|---|---|
| CN | 104888387 | A | 9/2015 |
| CN | 204734883 | U | 11/2015 |
| CN | 107412980 | A | 12/2017 |
| CN | 108042956 | A | 5/2018 |
| CN | 207477826 | U | 6/2018 |
| CN | 109529225 | A | 3/2019 |
| CN | 109603043 | A | 4/2019 |
| CN | 209092586 | U | 7/2019 |
| CN | 210409318 | U | 4/2020 |
| CN | 111569331 | A | 8/2020 |
| CN | 111672044 | A | 9/2020 |
| CN | 114191760 | A | 3/2022 |
| CN | 216824571 | U | 6/2022 |
| CN | 218517985 | U | 2/2023 |
| CN | 115845292 | A | 3/2023 |
| CN | 218652809 | U | 3/2023 |
| CN | 219185690 | U | 6/2023 |
| JP | 2006020747 | A | 1/2006 |
| JP | 2015084820 | A | 5/2015 |
| JP | 6144062 | B2 | 6/2017 |
| KR | 100261631 | B1 | 7/2000 |
| KR | 100281520 | B1 | 11/2000 |
| KR | 200321508 | Y1 | 7/2003 |
| KR | 100452049 | B1 | 10/2004 |
| KR | 100646768 | B1 | 11/2006 |
| KR | 100716473 | B1 | 5/2007 |
| KR | 101264840 | B1 | 5/2013 |
| KR | 101308093 | B1 | 9/2013 |
| KR | 101647985 | B1 | 8/2016 |
| KR | 20200132615 | A | 11/2020 |
| KR | 102433908 | B1 | 8/2022 |
| WO | WO2021125427 | A1 | 6/2021 |

OTHER PUBLICATIONS

Elide Fire; Fire Extinguishing Ball; https://www.elidefire.com/elidefire-techideas.

Fire Safety Supply; Fire extinguisher; https://www.firesafetysupply.net/sentry-water-fire-extinguisher-parts.

Reacton Fire Suppression LTD; Reacton Heavy How It Works: Plant Excavator Single Agent Automatic Fire Suppression System; https://www.youtube.com/watch?v=JqxgqJ7sDYE.

Rotarex Firetec; FireDETEC Fire Suppression System for Commercial Kitchens; https://www.youtube.com/watch?v=ViQ9KtCr1pQ.

Safex; Auto safe automatic fire extinguisher; http://www.safexfire.com/automatic-modular-fire-extinguishers.

* cited by examiner

DEVICE FOR DELIVERING GASES CONTAINED THEREIN FOR EXTINGUISHING FIRE IN AN ENCLOSED SPACE

REFERENCE TO RELATED APPLICATIONS

The present application is a continuation-in-part application of U.S. patent application Ser. No. 17/674,274, filed Feb. 17, 2022; which claims priority from U.S. Provisional Patent Application No. 63/150,144, filed Feb. 17, 2021; all of which are incorporated herein in their entirety and referenced thereto.

FIELD OF THE INVENTION

The present invention generally relates to a device for extinguishing fire. More specifically, the present invention relates to a device for storing and delivering gases for extinguishing fire in an enclosed space, the device configured for withstanding external forces without damage when pitched through an entry point into the enclosed space for extinguishing the fire thereby allowing first responders to enter the enclosed space and save people and things.

BACKGROUND OF THE INVENTION

Fire extinguishers can be classified into manually operated fire extinguishers or automatic fire extinguishers. Manually operated fire extinguishers come in portable form and allow humans to operate in the event of a fire. The automatic fire extinguishers include one or more sensors that detect fire/explosion and deploy. Both manually operated and automatic fire extinguishers may use gaseous, dry powder suppression agents or any other substance to extinguish the fire.

Several fire extinguishers capable of discharging fire-extinguishing agents to fire sites have been disclosed in the past. One such example is disclosed in a U.S. Pat. No. 9,162,096 entitled "Automatic fire extinguisher capable of discharging fire-extinguishing agent to fire site" (the "096 Patent"). The '096 Patent discloses an automatic fire extinguisher which is capable of automatically discharging a fire-extinguishing agent to a fire site without using power upon the occurrence of a fire to thus efficiently extinguish the fire, and which is also capable of sounding an alarm at an early stage upon the occurrence of a fire, to thus enable people to take swift action. The automatic fire extinguisher serves as a sprinkler, and can be reused after operation.

Another example is disclosed in a Korean granted patent No. 100716473 entitled "Automatic Fire Extinguisher" (the "473 Patent"). The '473 Patent discloses an automatic fire extinguisher that can be mounted on the kitchen ceiling of an apartment or a general house to extinguish a fire by automatically ejecting a fire extinguishing fluid in the event of a fire.

Another example is disclosed in a U.S. Pat. No. 9,956,445 entitled "Fire suppression system" (the "'445 Patent"). The '445 Patent discloses a fire suppression system for a fire zone including a first tank containing a first liquid component of a two-part foam and a second tank containing a second liquid component of the foam. The system includes at least one liquid component release device configured to be selectively capable of releasing the first and second components from their respective containers upon receipt of a signal from a fire detector upon detection of a fire. The two-part foam components are propelled through the system by a pressurized propellant that, upon release of the release device, causes the exit of the foam components from their respective tanks, through a mixing conduit to at least one nozzle. The nozzle is configured to spray the liquid component foam mixture into the fire zone wherein the foam cures into a substantially semi-rigid, closed cell foam that is substantially impermeable and may have charring and/or intumescence properties.

Yet another example is disclosed in a U.S. Pat. No. 11,400,325 entitled "Fire suppression system" (the "'325 Patent"). The '325 Patent discloses a fire suppression system including an extinguisher assembly, a trigger assembly and a communication assembly. The extinguisher assembly including a fire extinguisher having a fire retardant within. The fire extinguisher including a plurality of nozzles aimed in various direction for dispersing the fire retardant in multiple directions. The trigger assembly being atop of the fire extinguisher. A lever included within the trigger assembly to actuate the trigger when needed. The lever suspended above of the trigger by a melting pillar. The melting pillar melting when temperatures from a fire within the appliance reach a predetermined threshold to allow said lever to engage the trigger from above. Thereby causing the fire retardant to be dispersed in multiple directions by the plurality of nozzles to extinguish the fire. This helps to protect users from costly repairs and potentially dying within the fire.

Although the above discussed fire extinguishers are useful in discharging fire-extinguishing agents to fire sites, their functionality becomes limited when people are trapped in an enclosed space. For example, in the event of fire in enclosed space that is not easily accessible, rescuing people or things trapped inside becomes a priority. When first responders arrive at the site, their options are to rush inside and hopefully find the person/things before the flames become unbearable, or douse the flames with water to gain entry. In such situations, it becomes difficult for them to rely on known fire extinguishers.

Therefore, there is a need for a device that can be pitched through a door, window or an improvised opening into the enclosed space, the device that is capable of delivering gases for extinguishing fire in the enclosed space and provide the first responders with either a timed extension to rescue the trapped people or things or potentially extinguish a burning room.

SUMMARY OF THE INVENTION

It is an object of the present invention to provide a device for delivering contained gases from one location to within an enclosed space for extinguishing fire and avoids the drawback of known fire extinguishers.

It is another object of the present invention to provide a device that allows first responders with either a timed extension to rescue trapped individuals/things or potentially extinguish a burning room.

It is another object of the present invention to provide a device that delivers gases into enclosed spaces and retains its shape before and after being pitched into the enclosed spaces.

It is another object of the present invention to provide a device that delivers gases in different directions to maximize the area of effect for dousing the fire, thereby allowing the first responders to enter the enclosed space and save people or things.

In order to overcome the limitations here stated, the present invention provides a device for delivering gases for extinguishing fire into enclosed spaces.

In one embodiment, the device includes a container for storing an extinguishing agent under pressure. The device includes an outer housing. The outer housing receives the container that comes in a cylindrical configuration. The outer housing includes slits. The device includes locking pins for locking the container to the outer housing. The device is operatively thrown into an enclosed space under fire such that the outer housing retains its shape upon impact without fragmenting while preventing damage to the container. The container operates to dispense the extinguishing agent through the slits for extinguishing the fire.

In another embodiment, the present invention discloses a device for delivering gases for extinguishing fire in an enclosed space. Here, the device comes in a spherical shape. The top and bottom of the device respectively have an entry hatch made of steel. Each hatch is held in place by four keyed cam locks. The device includes spiral bevel gears, a stationary ring and four pinions. The device winds with the help of a compression spring. The device further encompasses a planetary gear system that helps to activate the device to release the gases contained within. The gases include a clean agent and pressurized nitrogen that are safe to use in areas populated by humans. The planetary gear system is held in place until the device is pitched into the enclosed space. A user or first responder pitches the device into an enclosed space or burning room from outside. The compression spring releases its tension caused by the winding. This results in rotation of the spiral bevel gears, pinions contained within the spiral bevel gears and a sun gear in the planetary gear system. Here, each pinion is responsible for containing and releasing the gases stored therein. Each pinion connects to a cylinder that in turn connects to a cone having three slits. The three slits at each cone allow the gases to travel in different directions.

In one advantageous feature of the present invention, the device allows first responders with either a timed extension to rescue trapped individuals/things or potentially extinguish a burning room. The device withstands structure fires without becoming damaged. The gases contained inside the device are safe to use in areas populated by humans and are both effective and safe for inhalation.

Features and advantages of the invention hereof will become more apparent in light of the following detailed description of selected embodiments, as illustrated in the accompanying FIGS. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention as to enable those skilled in the art to practice the invention. It will be noted that throughout the appended drawings, like features are identified by like reference numerals. Notably, the FIGS. and examples are not meant to limit the scope of the present invention to a single embodiment, but other embodiments are possible by way of interchange of some or all of the described or illustrated elements and, further, wherein.

DETAILED DESCRIPTION OF THE EMBODIMENTS

Figure 1:
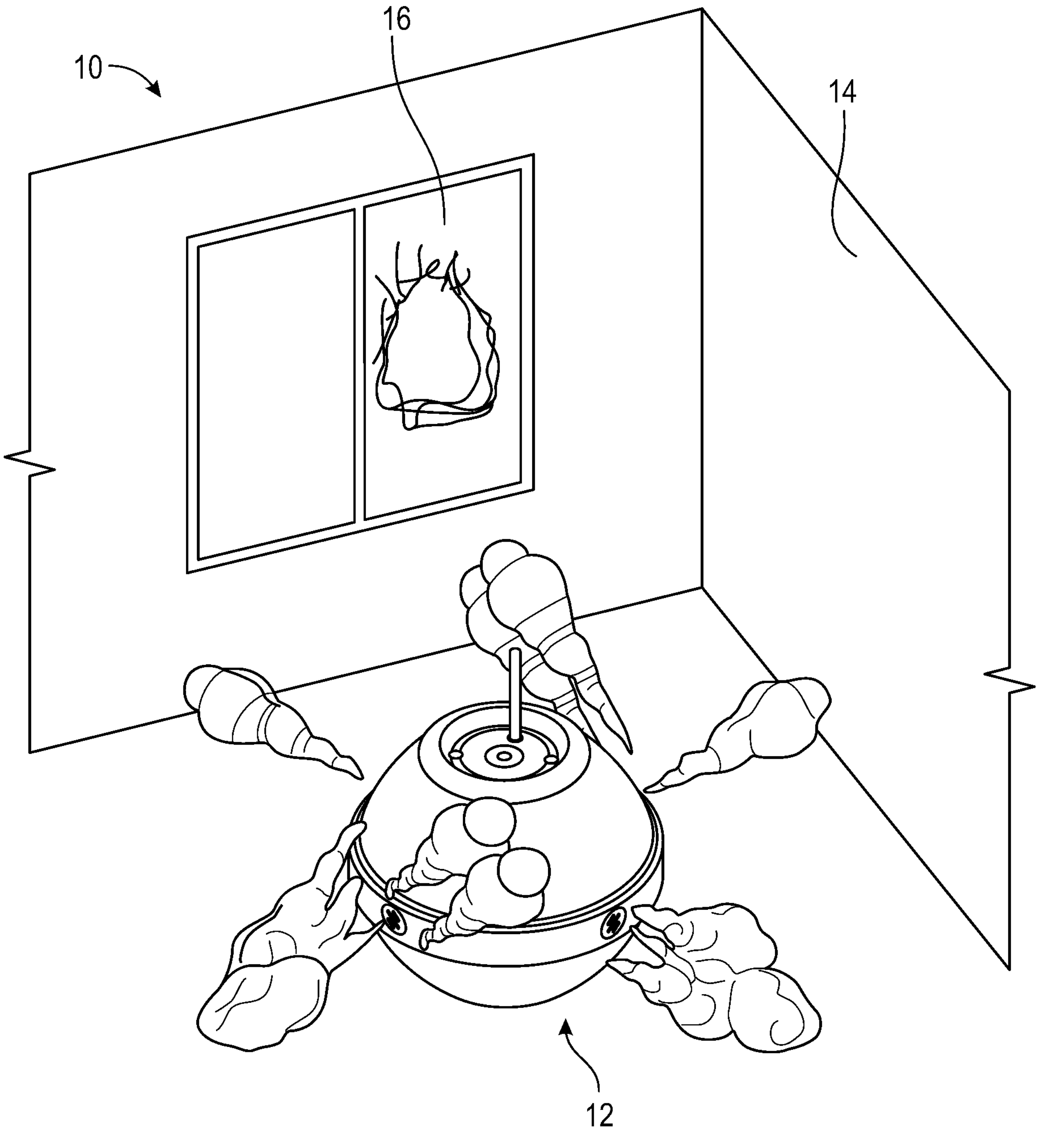
FIG. 1 illustrates an exemplary environment of a device pitched into an enclosed space for extinguishing fire, in accordance with one embodiment of the present invention.

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed device. However, it will be apparent to those skilled in the art that the presently disclosed invention may be practiced without these specific details. In some instances, well-known structures and devices are shown in functional or conceptual diagram form in order to avoid obscuring the concepts of the presently disclosed device.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes a device, it is to be further understood that numerous changes may arise in the details of the embodiments of the device. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

It should be understood that the present invention describes a device for delivering gases for extinguishing fire in an enclosed space prior to first responders entering the enclosed space. The device comes in a spherical shape. The top and bottom of the device respectively have an entry hatch. Each hatch is held in place by four keyed cam locks. The device includes spiral bevel gears, a stationary ring and four pinions. Each pinion is responsible for containing and releasing the gases stored therein. Each pinion connects to a cylinder that connects to a cone having slits. The slits allow the gases to travel in different directions. The device is pitched from outside into the enclosed space or burning room. The device allows first responders with either a timed extension to rescue trapped individuals/things or potentially extinguish the burning room. The device withstands structure fires without damage. The gases contained inside the device are safe to use in areas populated by humans and are both effective and safe for inhalation.

Various features and embodiments of a device for delivering gases for extinguishing fire in an enclosed space are explained in conjunction with the description of FIGS. 1-12.

In one embodiment, the present invention discloses a device for delivering gases for extinguishing fire in an enclosed space. FIG. 1 shows an exemplary environment 10 of a device 12 located in an enclosed space or structure 14 such as a room/building. Here, device 12 is launched or pitched into enclosed space 14 through a window or door or an improvised opening 16 from outside for extinguishing fire by delivering gases 112 such as clean agent and pressurized nitrogen. In accordance with the present invention, device 12 is launched into enclosed space 14 for extinguishing fire/flames such that fire fighters or first responders can safely enter enclosed space 14 and save people or things stuck in enclosed space 14.

Figure 2:
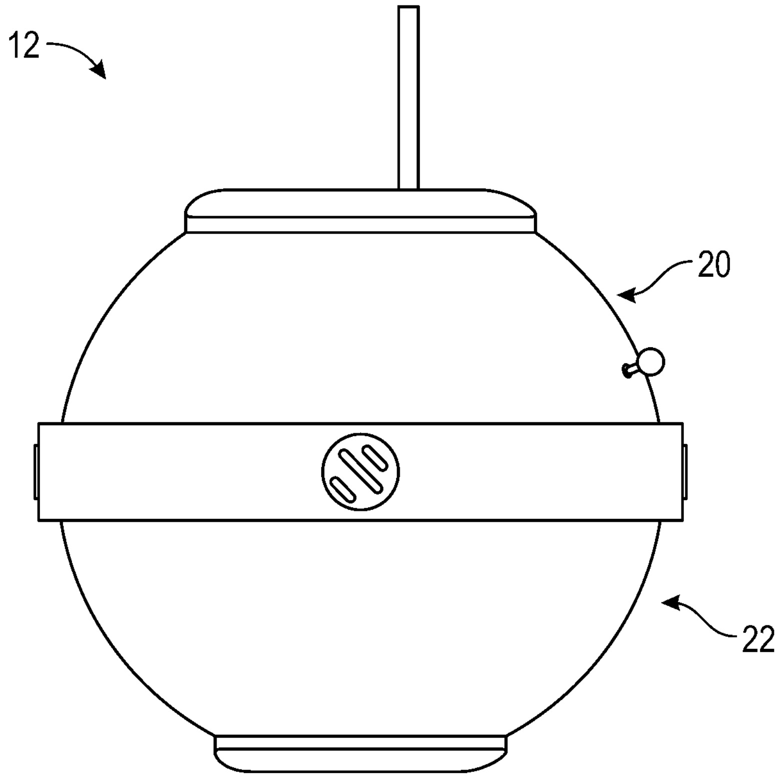
FIG. 2 illustrates a perspective view of the device.

FIG. 2 shows a front view of device 12, in accordance with one embodiment of the present invention. In one preferred embodiment, device 12 comes in a spherical shape. However, device 12 can come in any other shape that helps to retain the shape of device 12 before or after being pitched into enclosed space 14. Device 12 includes a first portion 20 and a second portion 22. First portion 20 indicates a top portion and second portion 22 indicates a bottom portion.

Figure 3A:
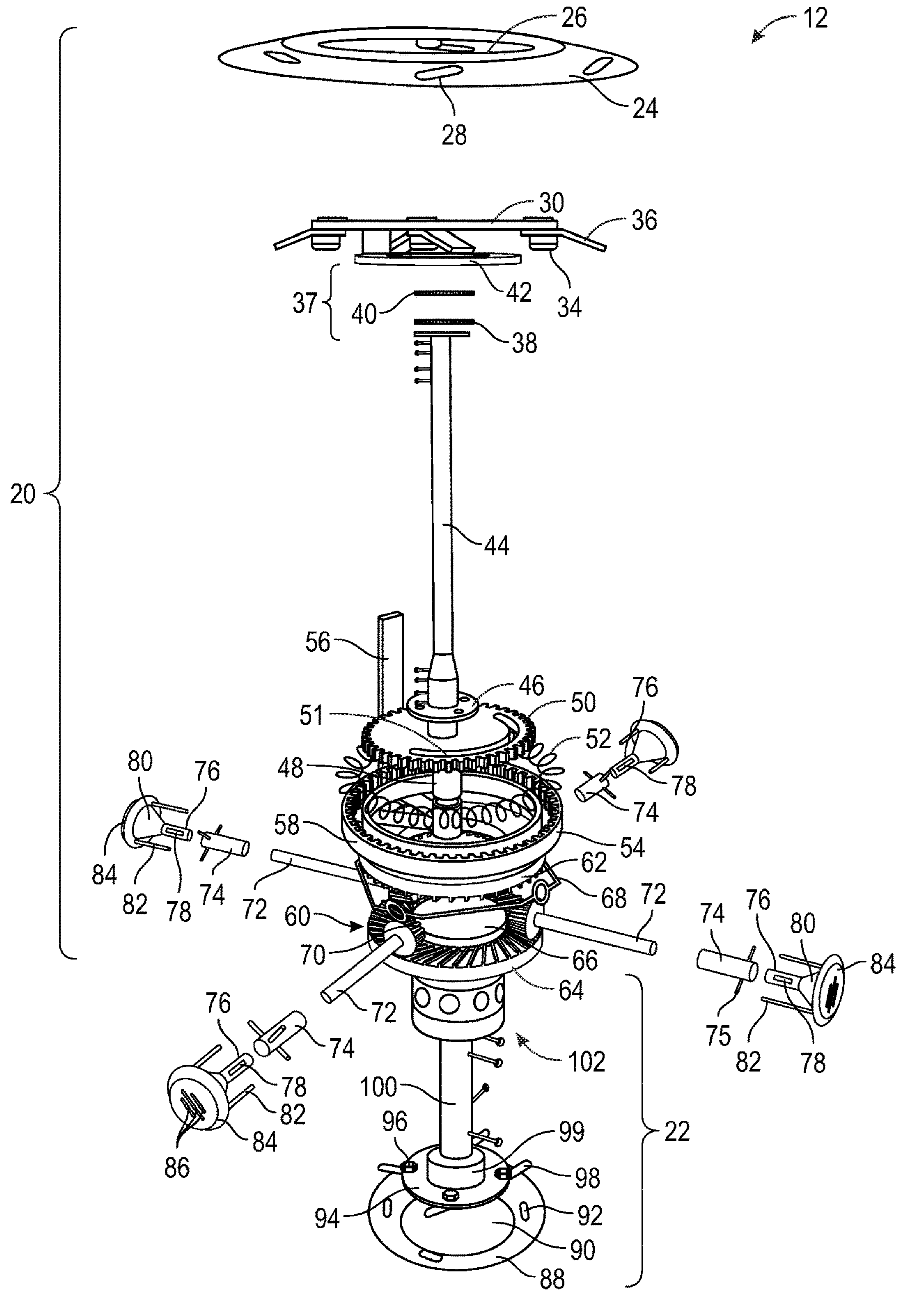
FIG. 3A, FIG. 3B and FIG. 3C show exploded views of the device.
Figure 3B:
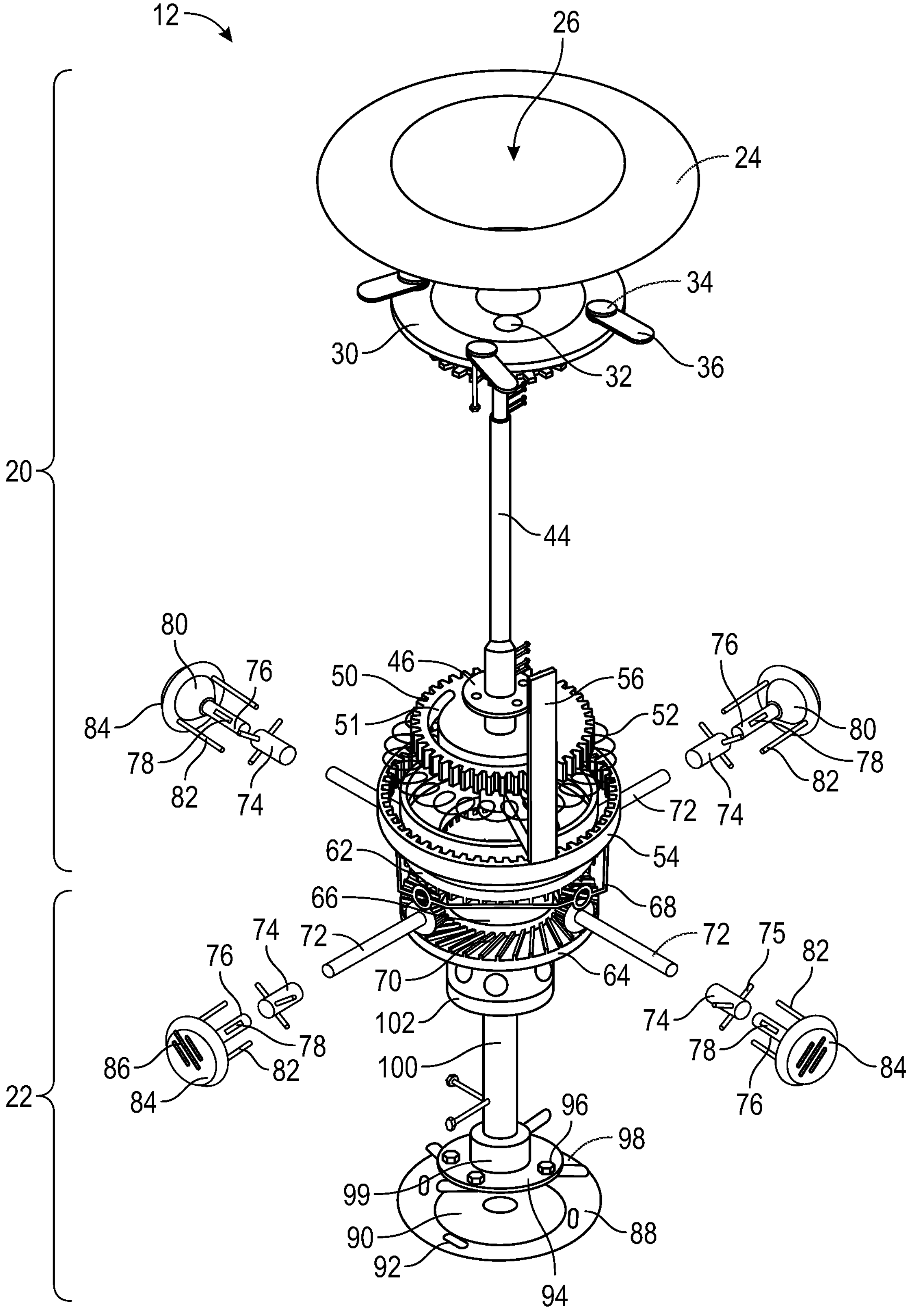
Figure 3C:
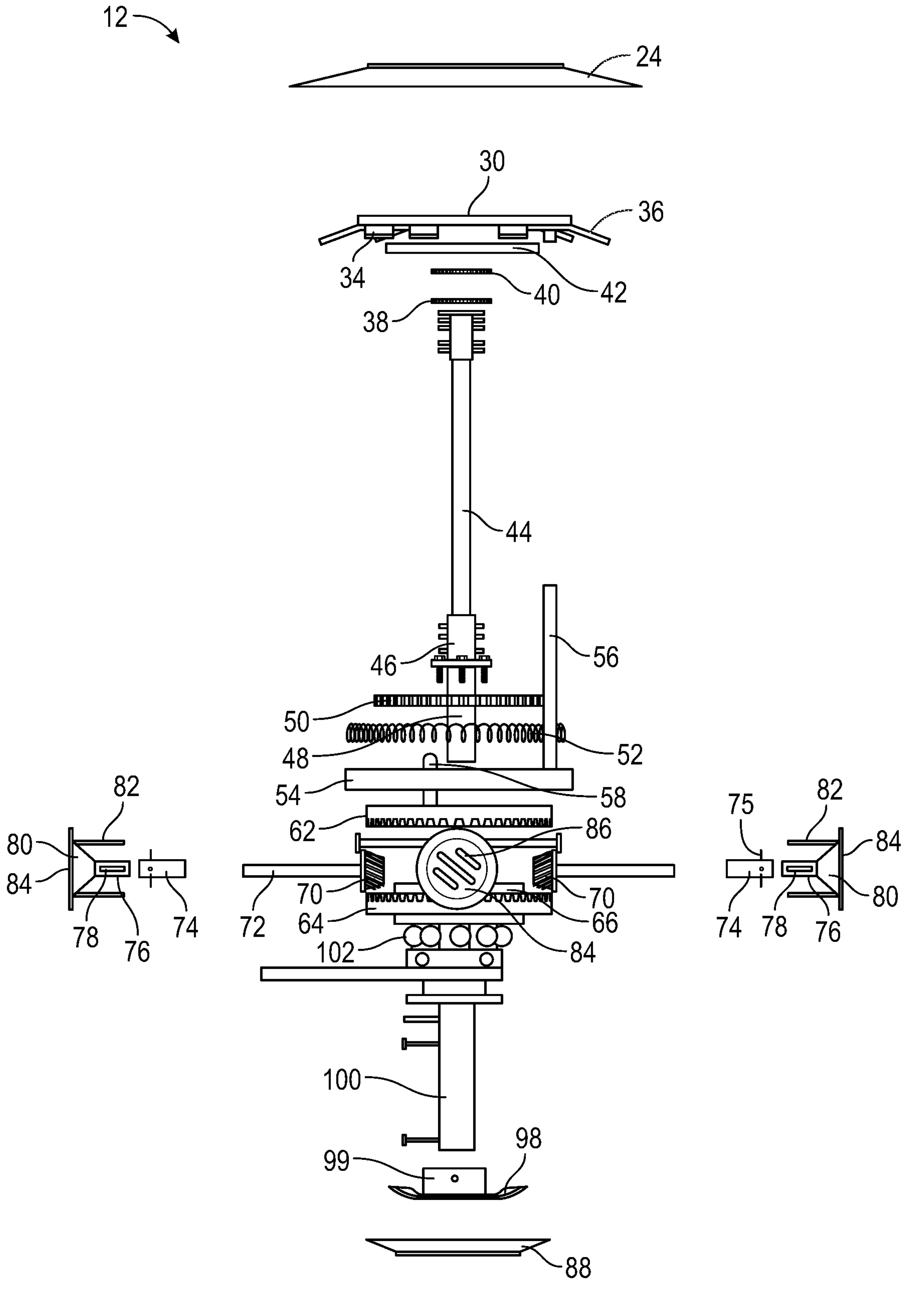
Figure 4:
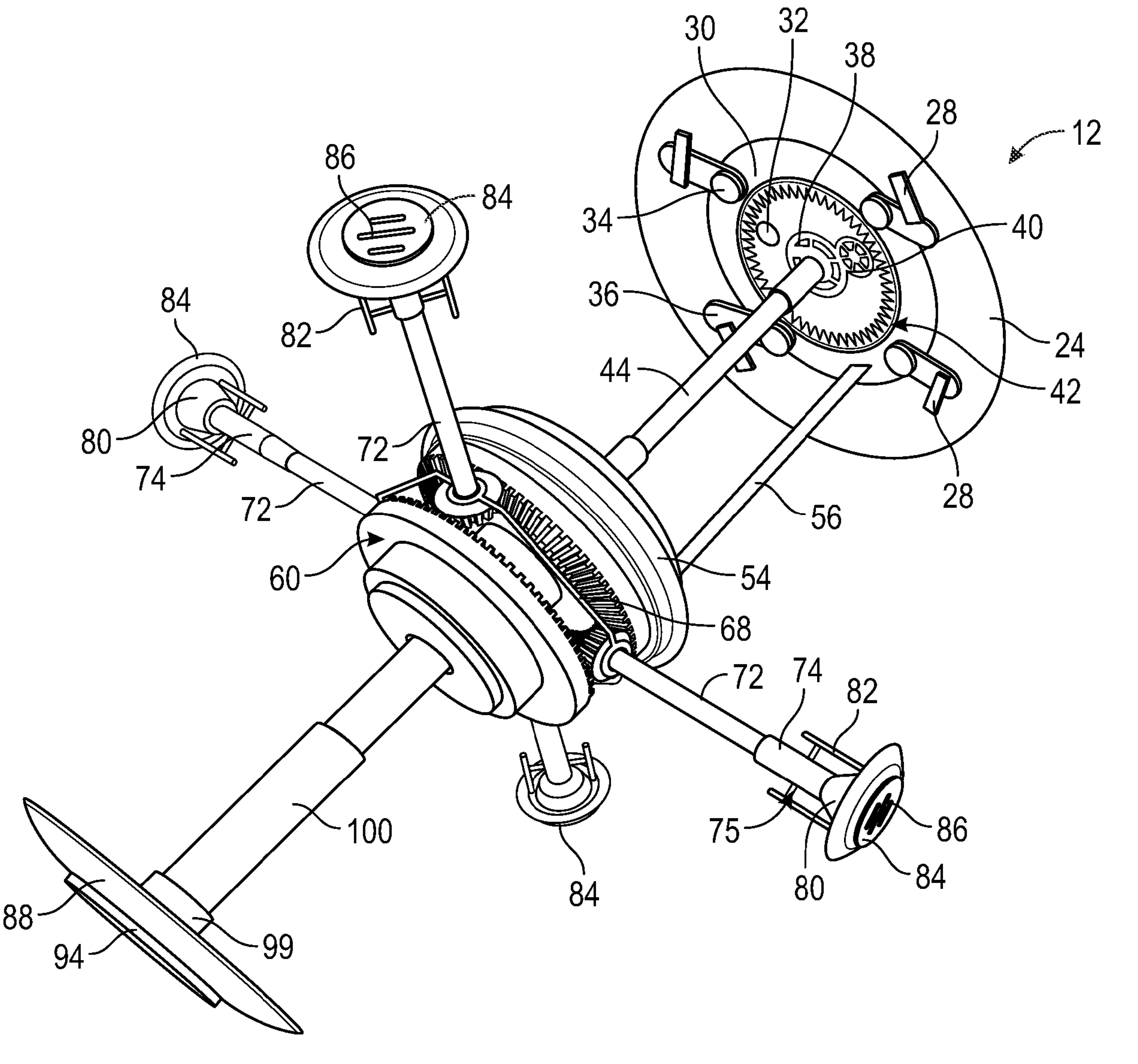
FIG. 4 shows internal connecting mechanism of the device.

FIG. 3A, FIG. 3B and FIG. 3C show exploded views of device 12, in accordance with one embodiment of the present invention. Further, FIG. 4 shows connection of internal components in device 12. First portion 20 includes a first entry hatch 24. First entry hatch 24 indicates a shell and comes in a semi-circular shape with a hollow portion 26 at the top. First entry hatch 14 provides a material made of metal such as steel, wood, hard plastic or any other suitable material. First entry hatch 14 provides a material capable of withstanding pressure and impact without any deformation. In one implementation, first entry hatch 14 provides a material having a melting point of 2750 degrees such that first entry hatch 14 retains its shape without fragmenting and possibly damaging the person/property inside.

Figure 5A:
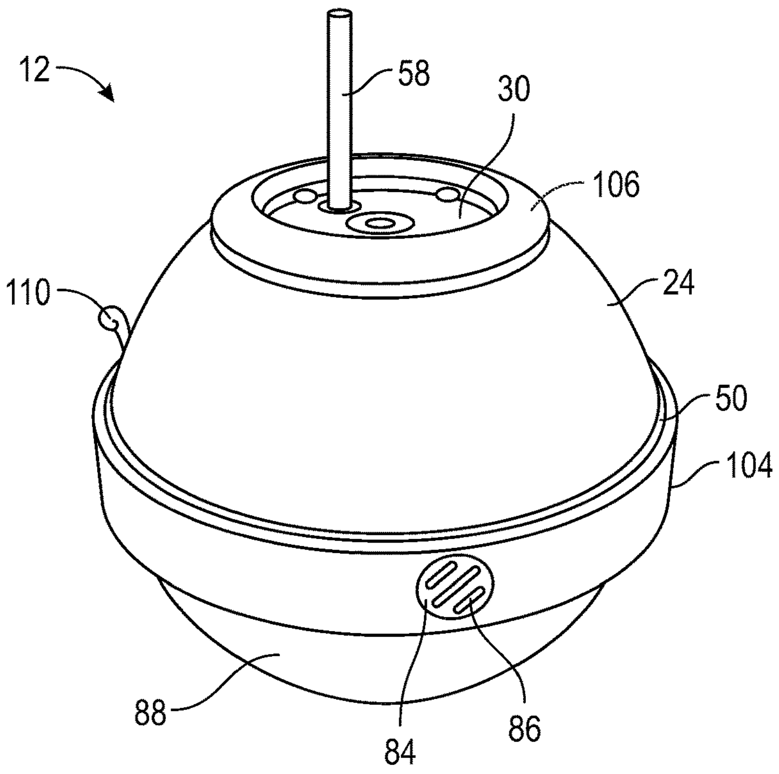
FIG. 5A, FIG. 5B, FIGS. 5C and 5D illustrate perspective, front, top and bottom view of the device.
Figure 5B:
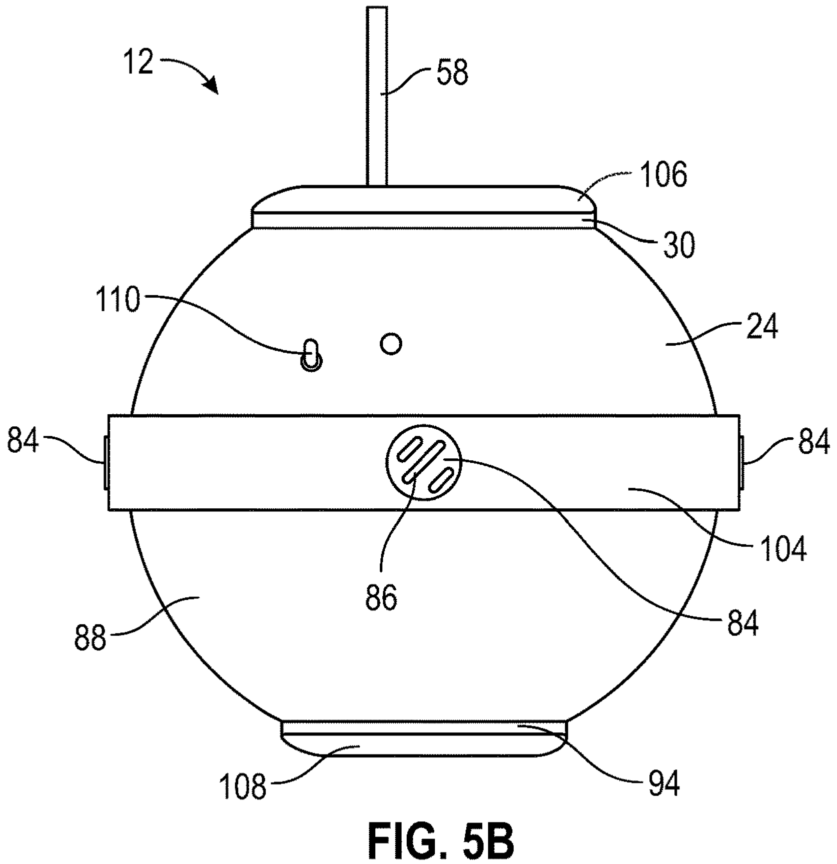
Figure 5C:
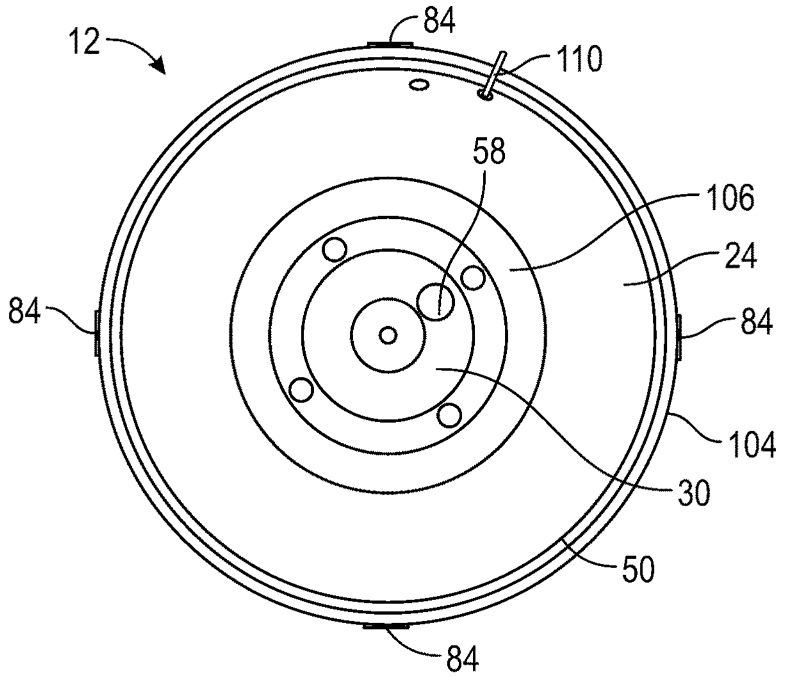
Figure 5D:
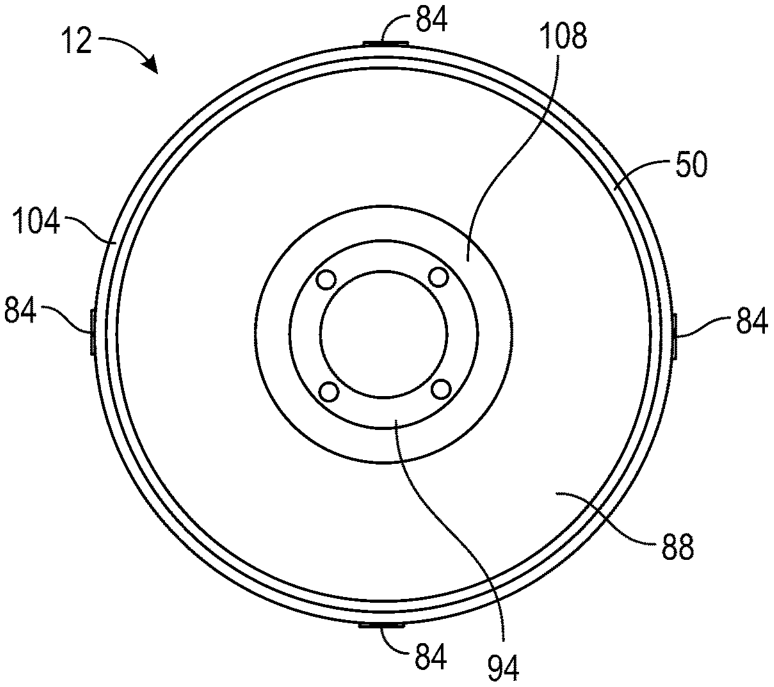

First entry hatch 24 encompasses first keyed cam locks 28 underneath. In one example, first entry hatch 24 encompasses four first key cam locks 28. First portion 20 includes a first plate member 30. First plate member 30 provides a material made of rubber or any other suitable material capable of providing cushion effect. First plate member 30 sustains most of the impact when device 12 lands on its center or sides i.e., north/south poles. A person skilled in the art understands that first entry hatch 24 surrounds first plate member 30 and protects first plate member 30. In one example, first plate member 30 presents a rod receiving groove 32. Rod receiving groove 32 receives a rod 58 (FIG. 5A through 5C). First plate member 30 presents four circled parts 34 having first flaps 36. First flaps 36 provide material made of metal or rubber or any other suitable material. First flaps 36 extend from circled parts 34, as shown in FIG. 3A and FIG. 3B. First flaps 36 mount underneath first key cam locks 28 and allow to secure first plate member 30 to first entry hatch 24 (FIG. 4). Alternatively, first flaps 36 mount to first key cam locks 28 using a strong adhesive such that first plate member 30 mounts firmly to first entry hatch 24.

First portion 20 further includes a planetary gear system 37. Planetary gear system 37 mounts beneath first plate member 30 (FIG. 3A, FIG. 3B and FIG. 4). Planetary gear system 37 includes a sun gear 38 and a satellite or planet gear 40. As in the solar system, planetary gear system 37 has sun gear 38 (bigger gear) that connects to satellite gear 40. Satellite gear 40 revolves around sun gear 38 within a satellite ring 42. Satellite ring 42 connects beneath first plate member 30 using known mechanisms such as adhesive, for example.

First portion 20 encompasses a first elongated rod 44 that connects and extends from sun gear 38. One end of first elongated rod 44 connects to sun gear 38 and the other end connects to a circular plate 46. Circular plate 46 connects to a cylindrical tube 48 that connects to a gear 50. Gear 50 is surrounded by a related a compression spring 52. Compression spring 52 rests in a stationary ring 54. In other words, stationary ring 54 includes a step-like structure that receives and holds compression spring 52 encompassing gear 50. In one implementation, stationary ring 54 includes an elbow member 56 that extends from stationary ring 54. Elbow member 56 extends from stationary ring 54 and connects outside satellite ring 42 (FIG. 4).

In accordance with present embodiment, stationary ring 54 includes a second gear (not shown) that attaches to a spiral bevel gears 60. The second gear remains stationary while gear 50 compresses compression spring 52 by pushing against a small metal plate (not shown) inside cylindrical tube 48 attached to stationary ring 54 beneath it. The second gear remains stationary while gear 50 compresses compression spring 52 due to a ring (not shown) being sandwiched and separating gear 50 and stationary ring 54. Inside gear 50 and the ring, there is a clear path 51 for rod 58 attached to spiral bevel gear 60.

Stationary ring 54 attaches to spiral bevel gear 60 beneath it. Spiral bevel gear 60 connects to rod 58 that stands vertical and is visible from gear 50. Rod 58 draws through a path 51 in gear 50, and rod receiving groove 32 and is accessible from the outer side (FIG. 5A). Before compression spring 52 compresses, rod 58 is at the resting position. Whenever compression spring 52 is being compressed, rod 58 travels in path 51 in gear 50. When the spring inside cylindrical tube 48 is being wound, nearing its fullest potential, rod 58 comes close to the end of its path. Towards the end of path 51, gear 50 presents a small torsion spring (not shown). The torsion spring traps rod 58 located on spiral bevel gear 60. When rod 58 passes through the torsion spring, the torsion spring locks in place and traps rod 58 while simultaneously signaling a user of device 12 that compression spring 52 is wound completely. At this point, the user can pitch device 12 inside enclosed space 14.

Spiral bevel gear 60 includes a top bevel gear 62 and a bottom bevel gear 64. Bottom bevel gear 64 receives a plate 66 connecting a second elongated rod 100 via a ball bearing spinner 102. Top bevel gear 62 and bottom bevel gear 64 receive pinions 70. In one example, device 12 provides four pinions 70, each placed at 90 degrees away from each other in a horizontal plane. Pinions 70 are held together by a belt 68. In one implementation, belt 68 includes four rings (not shown) secured by thick metal wires. The four rings are connected, and surround the center of spiral bevel gear 60 (FIG. 4). Here, belt 68 stabilizes pinions 68 during an impact by holding them together.

Each pinion 68 includes a pinion rod 72 extending from it. As each pinion 70 is placed at 90 degrees away from each other, respective pinion rod 72 also extends at 90 degrees away from each other. Each pinion rod 72 connects to a first cylinder 74. In one example, pinion rod 72 includes threads that insert into a first cylinder 74. Further, each first cylinder 74 includes four small ring rods 75. Each small ring rod 75 faces 90 degrees away from each other on a vertical plane and includes rings attached at their respective end. Each first cylinder 74 acts as a "bridge", completely enveloping a cone cylinder 76 and part of pinion rod's 72. When device 12 is not wound, each first cylinder 74 mounts over cone cylinder 76 prevents gases 112 from releasing through airways 78 of cone cylinder 76.

As specified above, each first cylinder 74 connects to cone cylinder 76. In one example, each cone cylinder 76 presents two elongated airways 78 at its side. Cone cylinder 76 attaches to a cone 80. Cone 80 has a hollow structure inside and allows gas to flow through it. In one implementation, each cone 80 includes four medium length cone rods 82 placed at 90 degrees from another, facing towards first cylinder 74. Cone rods 82 connect to ring rods 75 on first cylinder 74 (FIG. 4) and provide stability.

Figure 6:
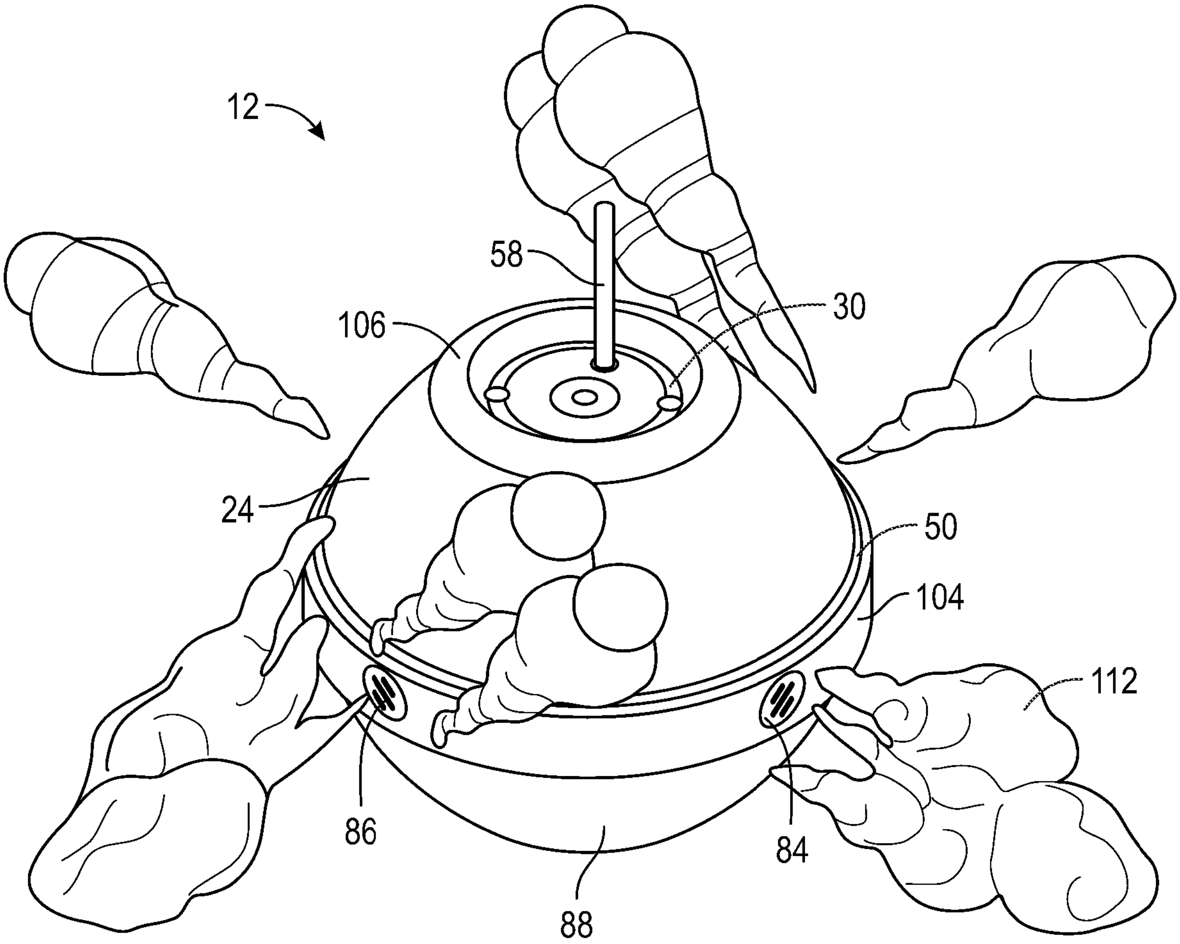
FIG. 6 illustrates an operational view of the device delivering the gases, in accordance with one embodiment of the present invention.

Each cone 80 connects to a cap-like structure 84. Cap-like structure 84 provides a material made of metal, wood, hard plastic or any other known materials. Cap-like structure 84 comes in a variety of shapes such as square, rectangular, circular, semi-circular or any other shape. As each cone 80 faces at 90 degrees away from each other horizontally, each cap-like structure 84 too faces at 90 degrees away from each other horizontally. Cap-like structure 84 encompasses three slits 86. Two of three slits 86 positions at a 45-degree angle or 1:30 on a clock on a vertical plane. Third slit 86 positions directing straight outward. In one implementation, next or adjacent cap-like structure 84 i.e., cap-like structure 84 on a horizontal 90-degree plane includes first two slits 86 facing a downward 45-degree angle or a 4:30 on a clock on a vertical plane. As presented above, the third slit 86 directs gases 112 straight outward. The remaining two cap-like structures 84 mirror the other on a horizontal 180-degree plane (FIG. 6).

Second portion 24 includes a second entry hatch 88. Second entry hatch 88 comes in a semi-circular shape with hollow portion 90 at the bottom. Second entry hatch 88 provides a material made of metal such as steel, wood, hard plastic or any other suitable material. Second entry hatch 88 provides a material capable of withstanding pressure and impact without any deformation. In one implementation, second entry hatch 88 provides a material having a melting point of 2750 degrees such that second entry hatch 88 retains its shape without fragmenting and possibly damaging the person/property inside.

Second entry hatch 88 encompasses second keyed cam locks 92. In one example, second entry hatch 88 encompasses four second keyed cam locks underneath 92. Second portion 22 includes a second plate member 94. Second plate member 94 provides a material made of rubber or any other suitable material capable of providing cushion effect. Second plate member 94 sustains most of the impact when device 12 lands on its center or sides i.e., north/south poles. A person skilled in the art understands that second entry hatch 88 surrounds second plate member 94 and protects second plate member 94. Second plate member 94 presents four circled parts 96 having second flaps 98. Second flaps 98 provide material made of metal or rubber or any other suitable material. Second flaps 98 extend from circled parts 34, as shown in FIG. 3A and FIG. 3B. Second flaps 98 mount underneath second key cam locks 92 and allow securing second plate member 94 to second entry hatch 88. Alternatively, second flaps 98 mount to second keyed cam locks underneath 92 using a strong adhesive such that second plate member 94 mounts firmly to second entry hatch 88.

Second plate member 94 connects to a second elongated rod 100 via cup-like structure 99. Second elongated rod 100 connects to a ball bearing spinner 102. Outer ring of ball bearing spinner 102 holds spiral bevel gears 60 via plate 66. Here, ball bearing spinner 102 allows second elongated rod 100 to rotate or turn with respect to spiral bevel gears 60.

In the current embodiment, first entry hatch 24 has size greater than second entry hatch 88. Second entry hatch 88 is smaller as compression spring 52 surrounding stationary ring 54 adds extra size and cannot be removed without a wider opening. At the outer side, device 12 includes a cylindrical ring 104 that connects first entry hatch 24 and second hatch 88 and also receives cap-like structures 84. FIG. 5A, FIG. 5B, FIG. 5C and FIG. 5D show a perspective view, a front view, a top view and a bottom view, respectively of device 12. As can be seen, cylindrical ring 104 surrounds first entry hatch 24 and second hatch 88 at the center. Cylindrical ring 104 provides a material made of metal capable of withstanding impact and ensures the internal components are intact. Further, first entry hatch 24 includes a first metal plate 106 at the top. First metal plate 106 mounts over first plate member 30 facing first entry hatch 24 and cushions impact on first plate member 30. Similarly, second hatch 88 includes a second metal plate 108 at the bottom. Second metal plate 108 mounts over second plate member 94 facing second entry hatch 88 and cushions impact on second plate member 94. In one implementation, first entry hatch 24 encompasses a refill port 110 for filling gases 112 inside device 12. In one example, gases 112 include a clean agent and pressurized nitrogen. Clean agent indicates an electrically non-conductive, volatile, or gaseous fire extinguishing agent (NFPA) that is safe to use in areas populated by humans. It is preferable to use clean agent/inert gas(as) 112 that is both effective and safe for inhalation as device 12 is useful to protect people or things stuck in enclosed space 14. However, a person skilled in the art understands that other gases that are suitable to extinguish fire and safe for humans may also be used.

As specified above, device 12 delivers gases 112 into enclosed space 14 when pitched through a window or door or an improvised opening 16 for extinguishing fire. At first, a user of device 12 fills gases 112 in device 12 via refill port 110. At rest and during the winding process, pinions 70 extend fully and offer no give or slack against an opposing force. Here, device 12 winds similar to a boat trailer jack for raising or lowering the trailer. Gear 50, stationary ring 54 and the second gear are held together by two top hat pieces. Gear 50 directly connects rod 58 with a large top hat. The crown of the hat screws to the exterior of rod 58. The brim of the large hat screws onto the center of gear 50 with four screws. The smaller but taller top hat inserts inside the interior of the hollow rod, beneath the larger top hat. The smaller hat holds in place stationary ring 54 and the second gear. Although both top hats secure to rod 58 and hold together gear 50, stationary ring 54 and the second gear, only gear 50 experiences motion. The reason being both stationary ring 54 and the second gear centers are smooth and hollow and do not offer any resistance to the rotating motion during the winding process. The smaller top hat keeps stationary ring 54 and the second gear in position.

The user winds rod 58 similar to raising or lowering the trailer. Here, rod 58 travels in clear path 51 and compresses compression spring 52. When the spring inside cylinder tube 48 is being wound, nearing its fullest potential, rod 58 moves closer to the end of its path 51. When rod 58 passes through the torsion spring, the torsion spring locks in place, trapping rod 58 while simultaneously signaling the user compression spring 52 is completely wound. From this point, the user is ready to pitch device 12 inside enclosed space 14.

In order to maximize the potential of compressed spring 52, the user holds satellite gear 40 in its final position. Any slack of compressed spring 52 hampers its ability to allow gases 112 to release and potentially render device 12 ineffective. It is preferable to hold satellite gear 40 in its final resting place until pitching device 12 into enclosed space 14. Once the user deploys device 12 into enclosed space 14, compressed spring 52 releases its tension caused by the user. Here, both spiral bevel gears 60 rotate pinions 68 and sun gear 38 via first connecting rod 44. As pinions 68 rotate, pinion rods 70 also rotate. Here, pinion rods 70 rotate inside first cylinder 74. As pinions 68 rotate, pinion rods 70 reverse in direction. As specified above, first cylinder 74 includes four small ring rods 75 that connect to cone rods 82 at cone 80. Because first cylinder's 74 ring rods 75 secure to cone rods 82, first cylinder 74 itself reverses towards the center of device 12. While first cylinder 74 reverses in direction, first cylinder 74 exposes cone cylinder's 76 elongated airways 78, allowing more gas to be freed as it reverses further. A person skilled in the art understands that without winding device 12, first cylinder 74 would prevent gases 112 from releasing through cone cylinders 78.

As specified above, cones 80 connect to cap-like structures 84 having slits 86. Slits 86 at adjacent cones 80 allow to direct or release gases 112 in different directions. As specified above, two of three slits 86 positions at a 45-degree angle or 1:30 on a clock on a vertical plane and the third slit 86 positions directing straight outward. This structure allows the gases 112 to travel in different directions. The speed at which spiral bevel gears 60 rotate can be configured in order to maximize the area of effect (AOE) for delivering gases 112 to extinguish fire inside enclosed space 14. FIG. 6 shows an operational perspective view of device 12 delivering gases 112, in accordance with one embodiment of the present invention. When pitched into enclosed space 14 that is burning, gases 112 containing clean agent and pressurized nitrogen. Gases 112 are safe for human inhalation and disrupt the fire triangle by absorbing the heat instead of suffocating it similar to CO2. During or shortly after gases 112 have been exposed to enclosed space 14, firefighters or first responders can make entry and rescue persons or things.

As specified above, device 12 comes in a spherical shape and is made of steel having a melting point of 2750 degrees. The spherical shape allows device 12 to keep its shape before and after being pitched into enclosed space 14. Thus, there is no concern for device 12 fragmenting and possibly damaging the person/property inside enclosed space 14.

Device 12 can be refilled and used multiple times. Device 12 can be coated with suitable paint to prolong its life. Device 12 comes in a variety of sizes allowing the first responders to pitch into different enclosed spaces 14.

Figure 7:
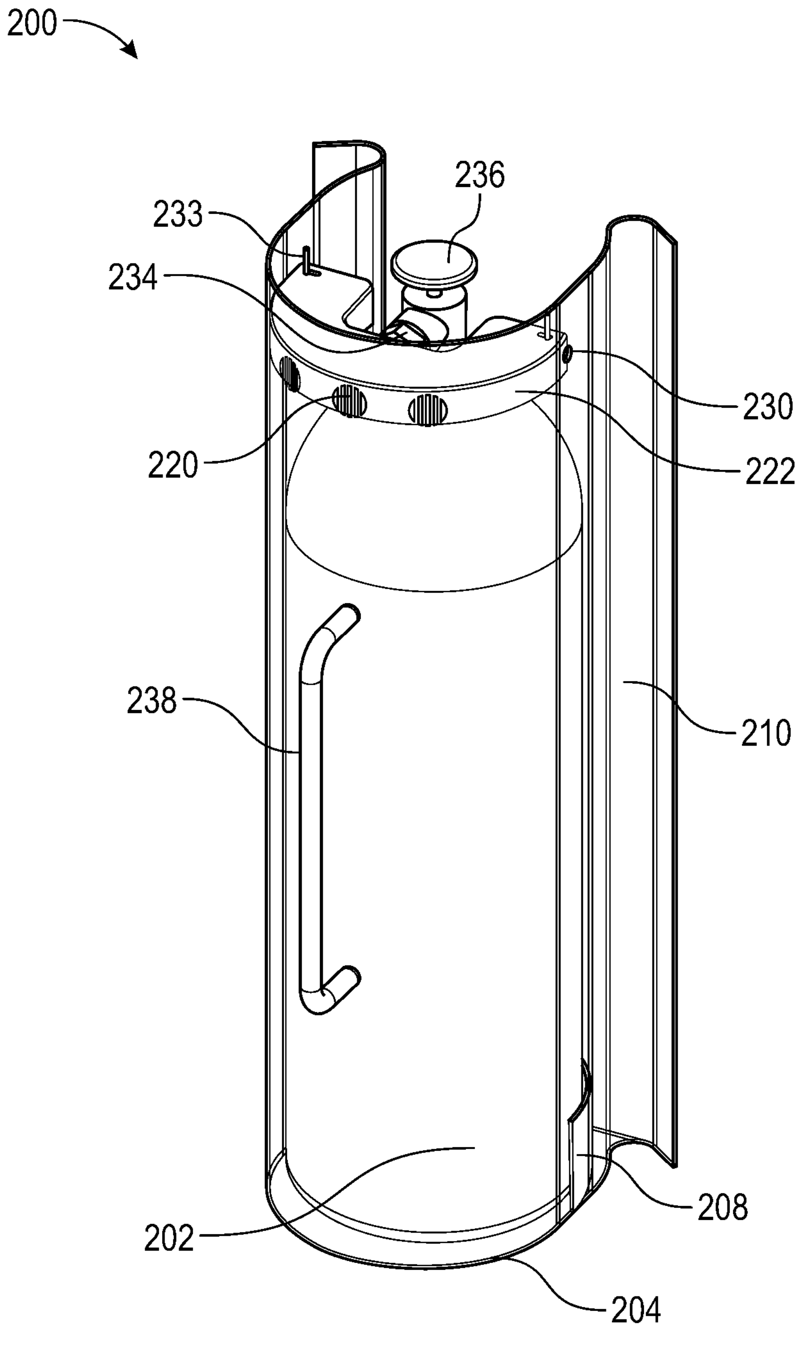
FIG. 7 illustrates a device for delivering gases for extinguishing fire in an enclosed space, in accordance with another embodiment of the present invention.
Figure 8:
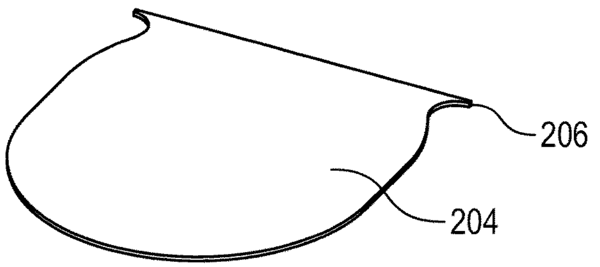
FIG. 8 illustrates a perspective view of a base plate, in accordance with one embodiment of the present invention.
Figure 9:
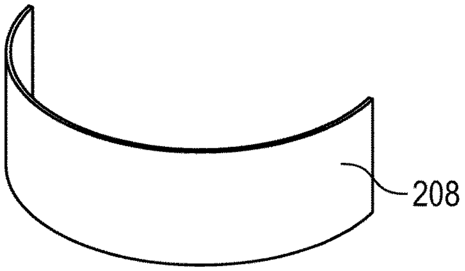
FIG. 9 illustrates a perspective view of a retainer ring, in accordance with one embodiment of the present invention.

Now referring to FIG. 7, a device 200 for delivering gases for extinguishing fire in an enclosed space, in accordance with another embodiment of the present invention. Device 200 includes a container or enclosure 202. Container 202 indicates a cylindrical body or pressure vessel configured for storing an extinguishing agent under pressure such as compressed nitrogen gas (CNG). Container 102 is made of metal such as steel or aluminum and is designed to withstand the pressure generated when device 200 is discharged. Device 200 includes a base plate 204. FIG. 8 shows a perspective view of base plate 204. Base plate 204 comes in a substantially semi-circular shape. Further, base plate 204 encompasses a curved section 206 at distal ends of the semi-circular shape. Base plate 204 is made up of metal or any other suitable material to withstand the fall when device 200 is thrown into buildings. Further, device 200 includes a retainer ring 208. FIG. 9 shows a perspective view of retainer ring 208, in accordance with one embodiment of the present invention. Retainer ring 208 comes in a semi-circular configuration and helps to retain container 202 over base plate 204, as can be seen from FIG. 7. Here, retainer ring 208 connects to base plate 204 and supports container 202 to be positioned in between retainer ring 208 and an outer housing 210.

Figure 10:
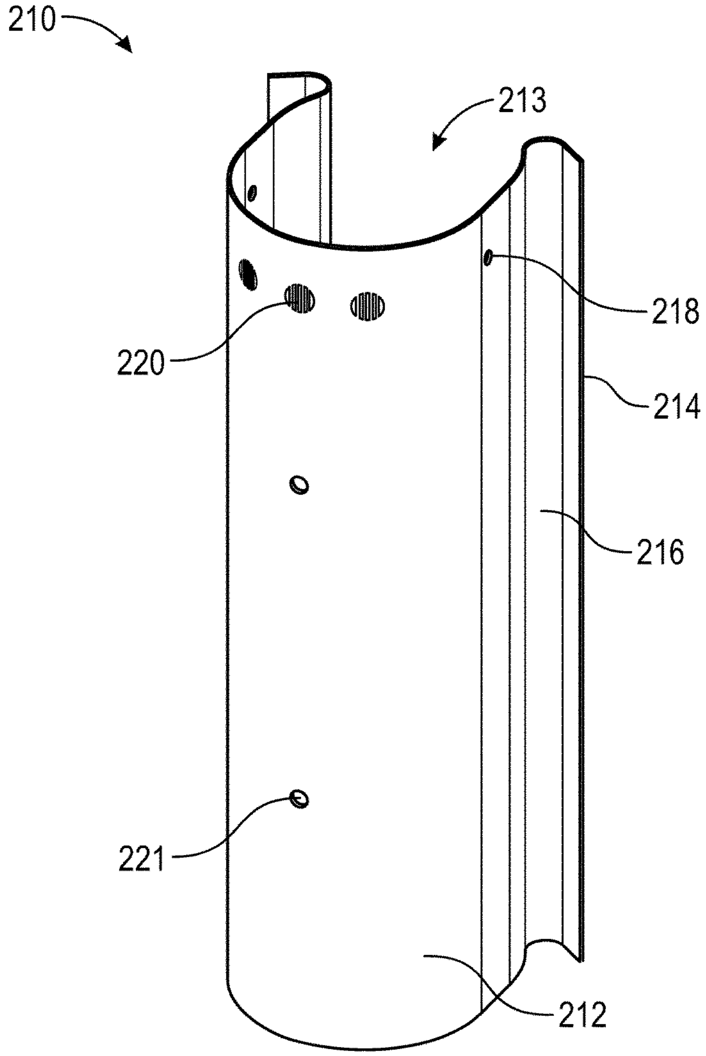
FIG. 10 illustrates a perspective view of an outer ring, in accordance with one embodiment of the present invention.

Outer housing 210 has an elongated semi-cylindrical section 212 with extended sections 214, as can be seen from FIG. 10. Semi-cylindrical section 212 presents an opening 213 for positioning or receiving container 202 into outer housing 210. In one example, semi-cylindrical section 212 comes in a transparent or translucent configuration depending on the need. Extended sections 214 extend from distal ends of semi-cylindrical section 212 and include curved section 216. Further, outer housing 210 includes pin holes 218 at the top. Pin holes 218 receive locking pins 230 and help to connect an internal vent block 222 to outer housing 210. In another embodiment, the locking pins 230 are replaced with bolts. In addition, semi-cylindrical section 212 presents a plurality of slits 220 positioned at different angles. In one example, slits 220 are positioned at 15 to 30-degree angles from one another. Furthermore, outer housing 210 includes handle receiving sections 221. Handle receiving sections 221 indicate holes provided at the elongated semi-cylindrical section 212 for receiving a handle 238.

Figure 11:
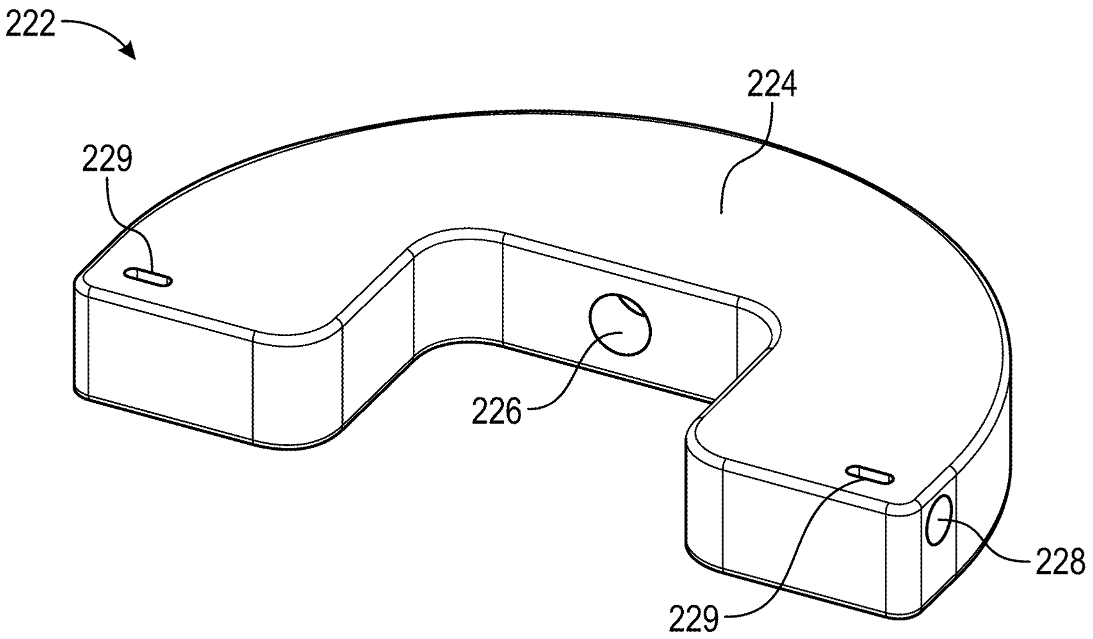
FIG. 11 illustrates a perspective view of an internal vent block, in accordance with one embodiment of the present invention.

Referring back to FIG. 7, device 200 includes internal vent block 222. Internal vent block 222 comes in a semi-circular configuration 224 with a cut-section. FIG. 11 shows a perspective view of internal vent block 222, in accordance with one embodiment of the present invention. Internal vent block 222 encompasses a dispense hole 226. The cut-section helps to position a neck portion of container 202. In one example, dispense hole 226 is positioned at the cut-section in internal vent block 222. Further, internal vent block 222 includes block holes 228. Block holes 228 position at the outer side of internal vent block 222 and align with pin holes 218 when internal vent block 222 is connected to outer housing 210. Further, internal vent block 222 includes lock holes 229 at the top.

Figure 12:
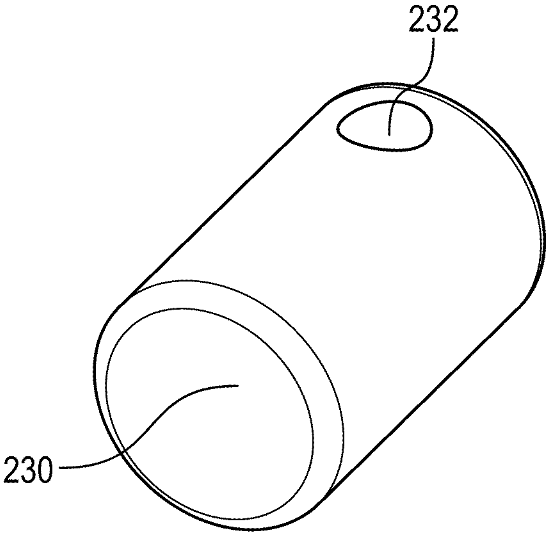
FIG. 12 illustrates a perspective view of a locking pin, in accordance with one embodiment of the present invention.

Further, device 200 includes locking pins 230 or, equivalently, bolts. FIG. 12 shows a perspective view of locking pin 230. Locking pin 230 comes in a cylindrical configuration and includes a locking pin hole 232 facing top. Referring back to FIG. 7, locking pins 230 insert in pin holes 218 and draw through block holes 228 connecting internal vent block 222 to outer housing 210. Subsequently, a retaining pin 233 is inserted from the top into locking pin hole 232 to lock the position of internal vent block 222 with outer housing 210.

Additionally, container 202 encompasses a valve 236 at the top. Actuating valve 236 operatively connects to a hose 234 that connects to dispense hole 126. Further, device 200 includes a handle 238. Handle 238 connects to outer housing 210 via handle receiving sections 221.

In the present embodiment, handle 238 is connected to outer housing 210. Further, base plate 204 is connected to outer housing 210. Subsequently, retainer ring 208 is connected at the bottom of outer housing 210. Further, container 202 is positioned inside outer housing 210. Furthermore, internal vent block 222 is placed at the top of container 202 such that dispense hole 226 aligns with one of slits 220 positioned at outer housing 210. Here, locking pins 230 insert in pin holes 128 and then retaining pins 233 are inserted in lock holes 229 to lock internal vent block 222 to outer housing 210. Equivalently, bolts may be used in place of locking pins 230.

In use, device 200 is thrown into a building that is burning. Here, outer housing 210 and base plate 204 ensure device 200 stays intact without causing any damage to container 202. A user may hold device 200 using handle 238 and position slits 220 in the direction of the fire. Subquery, valve 236 is actuated to dispense the extinguishing agent stored in container 202 through hose 234 and slits 220 for extinguishing the fire.

Based on the above, it is evident that the device delivers contained gases from one location to within an enclosed space and acts as a fire suppression system. The device provides first responders with either a timed extension to rescue trapped individuals/things or potentially extinguish a burning room. The device, due to its size and shape, is pitched through a door, window or an improvised opening. The device withstands structure fires without becoming damaged. The device delivers gases for extinguishing the fire, the gases that are safe to use in areas populated by humans.

A person skilled in the art appreciates that the device may come in a variety of sizes depending on the need and comfort of the first responders. Further, different materials in addition to or instead of materials described herein may also be used and such implementations may be construed to be within the scope of the present invention. Further, many changes in the design and placement of components may take place without deviating from the scope of the presently disclosed device.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

I claim:

1. A device for delivering gases for extinguishing fire in an enclosed space, said device comprising:
- a container for storing an extinguishing agent under pressure, wherein said container comprises a cylindrical configuration;
- a base plate having a substantially semi-circular shape with curved sections at distal ends of the semi-circular shape, wherein said base plate mounts at the bottom of an outer housing and withstands impact when said device is thrown into said enclosed space;
- a retainer ring in a semicircular configuration, wherein said retainer ring connects to said base plate and supports said container;
- an outer housing having an elongated semi-cylindrical section with an opening for receiving said container, and extended sections extending from distal ends of said semi-cylindrical section, said extended sections including curved sections, wherein said outer housing comprises slits positioned at said semi-cylindrical section; and
- an internal vent block comprising a dispense hole, wherein said dispense hole dispenses said extinguishing agent into said slits;
- wherein said device is operatively thrown into said enclosed space under fire such that said outer housing retains its shape upon impact without fragmenting while preventing damage to said container, and wherein said container operates to dispense said extinguishing agent through said slits for extinguishing the fire.

2. The device of claim 1, wherein said internal vent block comes in a semi-circular configuration with a cut-section for positioning a neck portion of said container.

3. The device of claim 1, wherein said dispense hole aligns with a slit of said slits and dispenses said extinguishing agent.

4. The device of claim 3, wherein said slits position at 15 to 30-degree angle from one another.

5. The device of claim 1, wherein said outer housing comprises pin holes, and wherein said pin holes receive locking pins for connecting said internal vent block to said outer housing.

6. The device of claim 5, wherein said internal vent block comprises lock holes, and wherein said lock holes receive retaining pins for adjusting the position of said dispense hole to align with a slit of said slits.

7. The device of claim 1, wherein said outer housing comprises a handle for carrying said device.

8. A method for providing a device for delivering gases for extinguishing fire in an enclosed space, said method comprising the steps of:
- providing a container for storing an extinguishing agent under pressure, said container having a cylindrical configuration;

providing a base plate having a substantially semi-circular shape with curved sections at distal ends of the semi-circular shape, said base plate mounting at the bottom of an outer housing and withstanding impact when said device is thrown into said enclosed space;

providing a retainer ring in a semicircular configuration, said retainer ring connecting to said base plate and supporting said container;

providing an outer housing having an elongated semi-cylindrical section with an opening for receiving said container, and extended sections extending from distal ends of said semi-cylindrical section, said extended sections including curved sections, wherein said outer housing comprises slits positioned at said semi-cylindrical section;

providing an internal vent block comprising a dispense hole, wherein said dispense hole aligns with a slit of said slits for dispensing said extinguishing agent;

operatively throwing said device into said enclosed space under fire such that said outer housing retains its shape without fragmenting upon impact while preventing damage to said container; and dispensing said extinguishing agent from said container through said slits for extinguishing the fire.

* * * * *